N. F. GARBO.
BALLOT ASSEMBLING MECHANISM.
APPLICATION FILED MAR. 20, 1916. RENEWED OCT. 29, 1920.

1,379,298.

Patented May 24, 1921.
2 SHEETS—SHEET 1.

WITNESSES
M. P. McJump
E. A. Paul

INVENTOR
NILS F. GARBO
BY Paul & Paul
ATTORNEYS

N. F. GARBO.
BALLOT ASSEMBLING MECHANISM.
APPLICATION FILED MAR. 20, 1916. RENEWED OCT. 29, 1920.

1,379,298.
Patented May 24, 1921.
2 SHEETS—SHEET 2.

WITNESSES
M. P. McInnis
E. A. Paul

INVENTOR
NILS F. GARBO
BY
Paul & Paul
ATTORNEYS

UNITED STATES PATENT OFFICE.

NILS F. GARBO, OF MINNEAPOLIS, MINNESOTA.

BALLOT-ASSEMBLING MECHANISM.

1,379,298.     Specification of Letters Patent.      Patented May 24, 1921.

Application filed March 20, 1916, Serial No. 85,524. Renewed October 29, 1920. Serial No. 420,581.

*To all whom it may concern:*

Be it known that I, NILS F. GARBO, a citizen of the United States, resident of Minneapolis, county of Hennepin, and State of Minnesota, have invented certain new and useful Improvements in Ballot-Assembling Mechanism, of which the following is a specification.

The object of this invention is to provide mechanism by which a series of ballots or other paper or flexible sheets may be quickly assembled in overlapping relation when they may be secured together and the overlapping relation permanently maintained, thereby permitting the marks upon the ballots to be easily and quickly counted.

The invention consists generally in a ballot assembling device provided with a series of spring-controlled, equally spaced clamping dogs, with means for setting and holding them in an open or elevated position, thereby permitting the ballots to be quickly assembled in the desired overlapping relation.

The invention consists further in the constructions and combinations hereinafter described and particularly pointed out in the claims.

Figure 2:
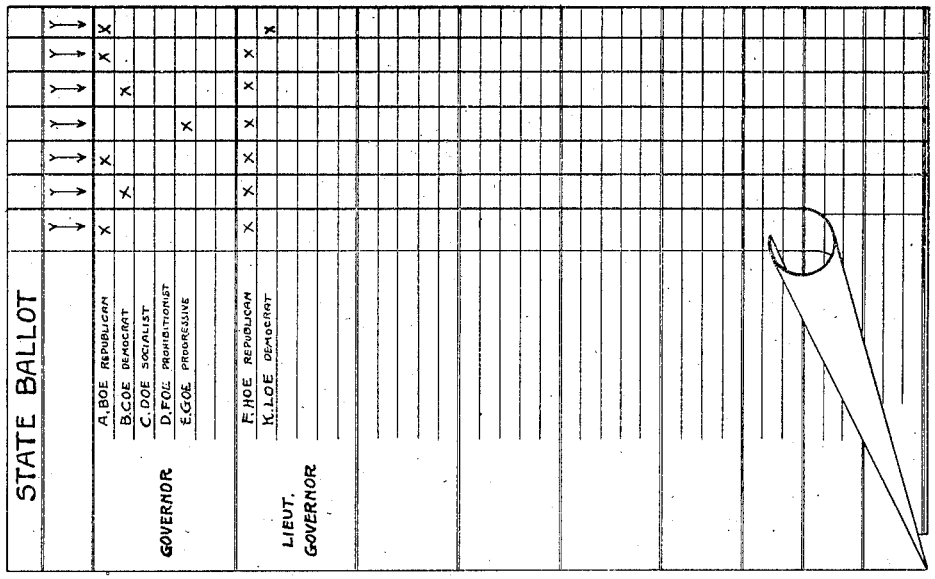
Figure 1:
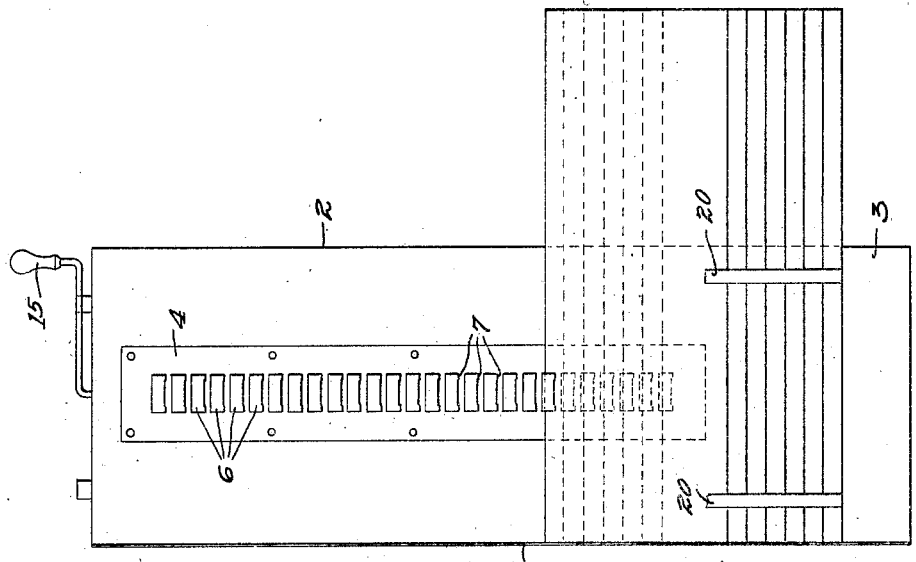
Figure 3:
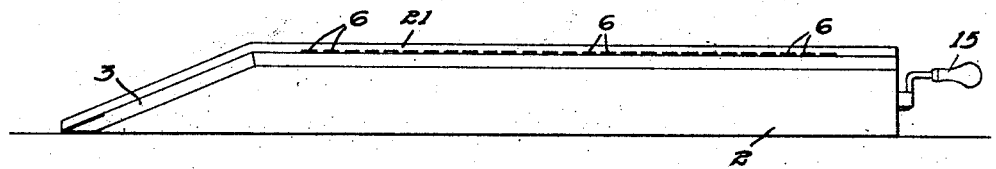
Figure 4:
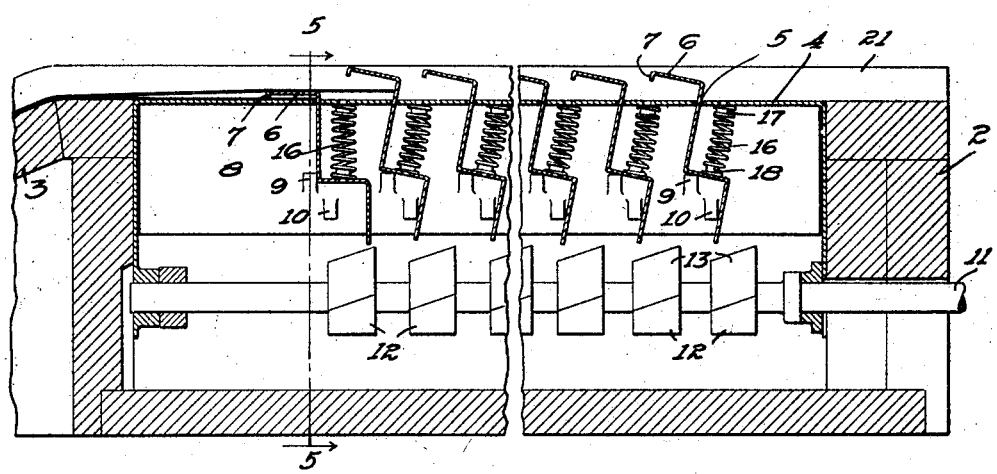
Figures 5, 6:
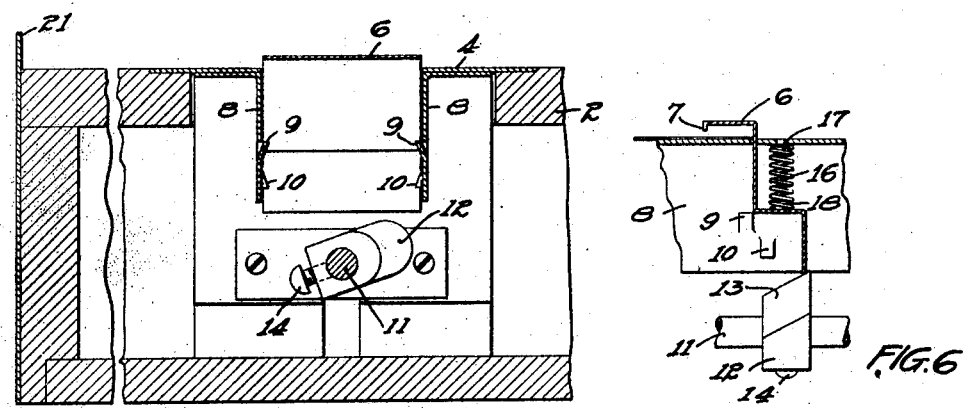

In the accompanying drawings forming part of this specification,

Figure 1 is a plan view of the mechanism embodying my invention, a number of ballots being shown assembled thereon, Fig. 2 is a front view of a number of assembled ballots, Fig. 3 is a side elevation of the assembling mechanism, Fig. 4 is a longitudinal vertical section partly broken away, showing the spring-controlled clamping dogs and means for setting them in elevated position, Fig. 5 is a transverse section on line 5—5 of Fig. 4, Fig. 6 is a detail of one of the clamping dogs and the elevating mechanism therefor.

In all of the drawings, 2 represents the frame or casing of the machine which is preferably of substantially rectangular form having a sloping end 3. The top of the frame or casing preferably consists mainly of a horizontal plate 4 provided with a series of slots 5, and through these slots project the upright portions or vertical clamping dogs 6. Each dog is preferably provided at its end with a downwardly turned holding rib 7. The dogs 6 are preferably in the form of two letters L joined together. They are preferably made of suitable sheet metal and their shape provides above the casing a portion that lies substantially horizontal when the dog is in clamping position, a vertical portion that extends through the slot 5, a horizontal portion extending rearwardly from the vertical portion and a depending or vertical part extending from the rear end of the horizontal portion. These dogs are preferably arranged between vertical walls 8, 8, preferably formed of sheet metal and each having an upper series of inwardly projecting lugs 9, and another series arranged on a lower plane of similar lugs 10. Extending lengthwise through the case and mounted in suitable bearings therein is a shaft 11 carrying a series of cams 12. These cams are preferably provided with the sloping operating ends 13. Said cams are preferably secured to the shaft 12 by suitable set-screws 14. Outside of the casing the shaft 14 is preferably provided with a suitable operating shank or handle 15. A series of springs 16 are arranged between the under surface of the top wall of the casing and the horizontal portion of the dog that is within the casing. I prefer to employ coil springs and to hold said springs in position by means of lugs 17 depending from the wall of the casing, and lugs 18 on the horizontal portions of said dogs.

To aid in assembling the sheets I may provide an upwardly extending rib 21 extending along one edge of the top of the casing.

*Operation.*

The clamping dog at the left in Fig. 4 illustrates the position that the dogs occupy when they are clamping a ballot or other sheet to the top of the casing. As here shown the portion of the dog that is above the casing extends horizontally or parallel with the top of the casing. From this horizontal portion extends a vertical portion of the dog projecting through the corresponding slot 5 and having its lower portion bearing against the edges of the lugs 9. A spring 16 arranged as described holds the dog normally in this position, with its lower end above the shaft 11. The parts are so arranged that one of the cams 12 comes under the lower end of each of said dogs. Assuming that the dogs are all in a depressed position and that it is desired to use the mechanism for assembling a series of ballots, the operator will grasp the handle 15 and turn the shaft 11. The cams 12 will engage the lower end of the clamping dogs and move them vertically until the upper vertical portions are above the tops of the lugs 9. The slanting face 13 of the cam will then move the lug into the position that all of those except the left-hand one in Fig. 4 are shown to occupy. As the horizontal portions of the dog move to the left they come on top of the lugs 9 and are pressed against said lugs by the springs 16, and the dogs are thereby held in the elevated position shown at the right in Fig. 4.

To assemble a series of ballots the operator will then place them on top of the casing, one at a time, the edge of the first ballot coming against the upright portion of the first clamping dog and below the horizontal portion of said dog. The operator will then press down on the top of the first clamping dog thereby swinging the horizontal portion that is within the casing clear of the lugs 9, and the spring 16 will then force this clamp downward into the position shown at the left in Fig. 4, thereby firmly clamping the ballot against the top of the casing. The next ballot or sheet is then put in position as indicated in Fig. 4 of the drawings, and this clamp is then released and permitted to clamp its ballot in a similar manner. This operation is repeated until all of the ballots have been clamped on top of the casing or as many ballots have been put in position as the mechanism will contain. The ballots are placed face downward on the case and after they are all clamped in position they will lie in an overlapping relation as shown in Fig. 1 of the drawings. Strips 20 are then pasted across the backs of all the ballots thereby permanently securing them in position. The faces of the ballots will appear as shown in Fig. 2, the first ballot being shown in full and only the marked columns of the succeeding ballot being visible. It will be understood that only like ballots will be assembled in this manner. The names of the candidates or persons to be voted for will be visible upon the first ballot of the series and the mark for each candidate on each ballot will appear opposite his name. Having the ballot assembled in the manner illustrated in Fig. 2 of the drawings, the votes for the different candidates may be very quickly counted, and an assembled lot of ballots may be permanently filed to be referred to at any time.

While I have described the use of the mechanism in assembling ballots, it will be understood that the same device may be employed for assembling other sheets or blanks.

As each clamp that is in holding position has the portion thereof that is outside of the casing extending substantially horizontal and lying very close to the top of the casing there is no interference with the placing of a ballot under the next succeeding clamp throughout the series.

The file can also be used for filing papers and adding figures in each line while the sheets are fastened with the clips; when the result is obtained the sheets can be taken out and re-sorted or filed. For this operation it is necessary to file papers with figures "up" so the projecting columns are visible.

While I have illustrated the preferred form of the invention it will be understood that I do not limit myself to the details herein shown and described, as the same may be varied in many particulars without departing from my invention, as expressed in the claims.

I claim as my invention:

1. The combination, with a casing having a flat surface upon which a series of flexible sheets may be placed, of a series of uniformly spaced, spring-controlled clamping dogs arranged to extend above said surface, and means for holding said dogs in an elevated position.

2. The combination, with a casing having a flat surface upon which a series of flexible sheets may be placed, of a series of uniformly spaced, spring-controlled clamping dogs arranged to extend above said surface, and means for raising and holding said dogs in an elevated position.

3. The combination, with a casing having a flat surface upon which a series of flexible sheet may be placed, of a series of uniformly spaced, spring-controlled clamping dogs arranged to extend above said surface, means for raising and holding said dogs in an elevated position, said holding means permitting any one of said dogs to be released when the raising means is withdrawn and to be brought by its controlling spring into clamping position.

4. The combination, with a casing having a flat surface upon which a series of flexible sheets may be placed, of a series of spring-controlled clamping dogs supported within said casing and projecting above the top thereof, means for simultaneously elevating all of said dogs and holding them in an elevated position, said holding means permitting each of said dogs to be independently released when the raising means is withdrawn and moved by its controlling spring into clamping position.

5. The combination, with a casing, provided with a top having a series of slots therein, of a series of clamping dogs extending through said slots, and having horizontally extending clamping portions arranged to coöperate with the upper surface of said casing, springs within said casing engaging said dogs and tending to hold them in clamping position and means within the casing for simultaneously raising and holding all of said dogs in an elevated position.

6. The combination, with a casing, provided with a top having a series of slots therein, of a series of clamping dogs extending through said slots, and having horizontally extending clamping portions arranged to coöperate with the upper surface of said casing, springs within said casing engaging said dogs and tending to hold them in clamping position, means within the casing for simultaneously raising and holding all of said dogs in an elevated position, said holding means permitting each of said dogs to be independently released when the raising means is withdrawn and moved by its spring into clamping position.

7. The combination, with a casing having a smooth upper surface and an upwardly projecting rib extending along one side thereof, of a series of uniformly spaced clamping dogs arranged to be projected above said top and to separately clamp flexible sheets placed upon said casing singly and in overlapping relation, said ribs forming a guide to aid in the assembling of said sheets.

8. The combination, with a casing having a smooth upper surface and an upwardly projecting rib extending along one side thereof, of a series of uniformly spaced clamping dogs arranged to be projected above said upper surface and to separately clamp flexible sheets placed upon said casing singly and in overlapping relation.

In witness whereof, I have hereunto set my hand this 8 day of March, 1916.

NILS F. GARBO.